2,857,408
S-ACYL PANTETHEINES AND PROCESS FOR THE PRODUCTION THEREOF

Ernst H. Felder and Davide Pitrè, Milan, Italy, assignors to Dr. Fulvio Bracco, Milan, Italy No Drawing. Application June 12, 1956
Serial No. 590,846

Claims priority, application Switzerland June 15, 1955

8 Claims. (Cl. 260—402.5)

This invention relates to a new and advantageous process for the production of S-acyl-pantetheines and to certain new and useful S-acyl-pantetheines.

S-acyl-pantetheines and especially the higher aliphatic S-acyl derivatives are pharmaceutically valuable compounds. They generally exhibit biological effects similar to those of the parent substance pantetheine, which as a component of co-enzyme A occupies an important key position in the human fat and carbohydrate metabolism. As compared to pantetheine, however, they have the advantage of greater stability and easier accessibility. The compounds, which can conveniently be obtained as pure crystalline substances, because of their increased stability as compared to the parent body enable a controlled and protracted physiological effect to be obtained in the organism for the first time. Unlike the low molecular weight S-acyl derivatives, which are fatty or oily products, they are crystalline bodies melting between 50° C. and 60° C. and can readily be made up in pharmaceutical form suitable for administration, for example as tablets, dragees, suppositories and salves.

S-acyl-pantetheines, especially S-α-and β-naphthoyl-pantetheines which can easily be recrystallized and can readily be saponified, serve also with advantage as intermediate products for the production of pantetheine. This is more particularly the case because the new process which forms a principal object of the present invention makes them readily and cheaply accessible.

The S-acyl-pantetheines hitherto known are limited to S-acetyl and S-benzoyl pantetheine. Their production has been described by R. Schwyzer (Helvetica Chimica Acta, 35, 1903–1907 (1952)). The known processes for the production of pantetheine and its derivatives are without exception complicated syntheses involving a plurality of stages. They require high experimental skill and expensive and complicated means such as apparatus for high vacuum, chromatography, counter-current extraction and low temperature. They are thus not suitable for the production of large quantities of substance. Moreover, most of these processes lead to impure resinous products of much reduced activity (c. f. for example Baddiley and Thain, Journal of the Chemical Society, 1952, 800, C. A., 47, 1079e, Swiss Patent No. 305,261). A subsequent purification by chromatography or counter-current extraction is generally necessary.

In some of the prior processes the SH-group is blocked during the reaction stages by etherification, which measure entails the regeneration of the SH-group at the end of the synthesis or during an intermediate stage thereof, generally by means of sodium in liquid ammonia, since the thioethers of pantetheine do not possess the valuable biological properties of the parent substance. R. Schwyzer makes use of a very complicated process for the production of his S-acyl-panthetheines. He started from calcium pantothenate, reacted this to form triethyl-ammonium pantothenate, and converted the latter by means of ethylchloroformate into the desired mixed acid anhydride of pantothenic acid and ethyl carbonic acid. The latter is converted into pantothenic acid ethylene imide by reaction with ethyleneimine in the presence of triethylamine. The pantothenic acid ethyleneimide without isolation from the reaction mixture was reacted with a thiocarboxylic acid (thioacetic acid or thiobenzoic acid) to form the desired S-acyl-pantotheine. The yields obtainable by this process are relative poor.

The process has various disadvantages. Since no intermediate products are isolated and the process involves a number of reaction stages, the product of the last reaction stage is in a solution which contains many by-products and impurities. The isolation is therefore difficult. The products, as has been found by repeating the directions of R. Schwyzer, can only be purified with much trouble and the expense of much time while observing precautions which are complicated and technically difficult to carry out. A further disadvantage is the use of the very poisonous ethyleneimine and the thio-carboxylic acids which are expensive and have an unpleasant and penetrating smell.

All these circumstances show the need for a simple and more economic process which requires less high skill and no complicated means such as apparatus for chromatography, counter-current expansion, low temperature and high vacuum, and which employs cheaper starting materials and gives a purer product in a better yield.

It has been found that the process of the invention largely meets these requirements in a surprising manner. The process of the invention starts from a mixed acid anhydride of pantothenic acid and leads directly to the desired product by reaction with the cheaper and readily accessible S-acyl-mercaptoethylamine hydrochloride in the presence of bases. The reaction is simple and its success is not tied to the maintenance of certain strict precautions. Since fewer by-products are present, isolation of the pure products is substantially simpler than by the hitherto described methods and the yields are also correspondingly better. Approximately 70% of the theoretical yield of the pure product is obtained.

The mixed acid anhydride of pantothenic acid can be a lower alkyl carboxylic acid anhydride, an alkyl carbonic acid anhydride, the azide, the sulphuric acid anhydride or the anhydride of an organic phosphoric acid (cf. for example B. Anderson et al., Journal of the American Chemical Society, 74, 5307 (1952)).

The S-acyl-mercaptoethylamine hydrochlorides employed in the present process can be produced for example by reacting acyl halides with 2-mercaptoethyl-amine hydrochloride in a simple manner and with yields of 90% (cf. for example Wieland et al., J. Liebigs Annalen der Chemie, 576, 20). 2-mercaptoethylamine hydrochloride itself is a cheap and inexpensive product. The desired S-acyl-pantetheines can be produced very simply by the above described process.

The compounds so produced, especially the higher aliphatic acyl derivatives, have substantial characteristic specific metabolic functions unlike the known S-acetyl and S-benzoyl derivatives. They make possible a strictly specific treatment of metabolic changes and deficiency symptoms such as is not possible with the pantothenic acid derivatives hitherto known. By suitable selection of the size of the acyl residue, the place and duration of the effect can be varied and thus adapted to specific therapeutic requirements. With increasing molecular weight the compounds show a marked increase in the duration of their effectiveness while the co-enzyme-A activity remains approximately the same. The higher aliphatic S-acyl-pantetheines are those particularly suitable for a protracted pantetheine effect, because in the organism the higher aliphatic acyl residue is degraded down to the acetic acid stage, which exerts fundamental metabolic functions in the form of the S-acyl compound.

EXAMPLE 1

10 gm. of calcium-d-pantothenate are dissolved in 15 cc. of water and treated with 2.65 gm. of oxalic acid in 10 cc. of water. The suspension thus obtained is stirred for 10 minutes and thereafter filtered with suction. The residue remaining on the filter is again suspended in water and again filtered.

The combined filtrates are treated with 11.5 gm. of tri-n-butylamine and thereafter concentrated under the reduced pressure produced by a water jet pump. The residue is dried completely for example with the aid of a good vacuum.

The tri-n-butylammonium salt thus obtained is suspended in approximately 50 cc. of ethyl acetate, cooled to —5° C. and 4.1 gm. of chloroformic acid ethyl ester in 20 cc. of ethyl acetate are added with stirring in the course of 5 to 10 minutes. After a short time a water-white solution of the mixed acid anhydride of pantothenic acid and ethylcarbonic acid is obtained, to which 7.6 gm. of tri-n-butylamine in 50 cc. of ethyl acetate are added while still maintaining the temperature at approximately —5° C.

After 10 to 15 minutes, 8.9 gm. of finely powdered S-benzoylmercaptoethylamine hydrochloride are added in a single portion with vigorous stirring. The brine bath is replaced by an ice-water bath. The temperature increases to 0° C. The mixture is further stirred for three hours.

500 cc. of ethyl acetate are now added to the reaction mixture which is then washed repeatedly with water containing a little hydrochloric acid ($2\times50$ cc.) and thereafter with pure water ($3\times25$ cc.). The ethyl acetate solution is dried with sodium sulphate and concentrated in vacuo to approximately 60 cc. After seeding or rubbing with a glass rod, the liquid is allowed to stand for a few hours until complete crystallization has taken place. In this way 7.5 gm. of S-benzoyl-pantetheine of melting point 113–114° C. are obtained. 7 gm. of a pure product melting at 117–117.5° C. are obtained by recrystallization from 60 cc. of ethyl acetate. A further 4 gm. of the product are recovered by concentrating the mother liquor. Yield 70%. The solubility of S-benzoyl-pantetheine in grams per 100 cc. is as follows: In ethanol 13, ethyl acetate 1, dioxan 10, tetrahydrofurane 35, acetone 5, dimethyl formamide 100. The pure crystalline compound is only sparingly soluble in water an ether.

Microanalysis: $C_{18}H_{26}O_5N_2S$—
 Calculated: C 56.52%; H 6.85%; N 7.32%; S 8.38%.
 Found: C 56.36%; H 7.03%; N 7.11%; S 8.53%.
 $(\alpha)_D^{26}=+31°\pm4°$ (c=1, in ethanol).

Notes on Example 1

(a) The equivalent quantity of triethylamine can be employed in place of tri-n-butylamine in the above example and in the following examples. This does not apparently affect the yield.

(b) The mixed acid anhydride of pantothenic acid and ethylcarbonic acid can also be obtained by reacting 10.1 gm. of dust-dry sodium-d-pantothenate in dry dimethylformamide with 4.1 gm. of chloroformic acid ester at 0° C. (cf. Wieland, Möller, Dickelmann, Chemische Berichte, 85, 1041).

7.6 gm. of tri-n-butylamine in approximately 100 cc. of ethyl acetate are added to the solution of the mixed acid anhydride thus obtained prior to the reaction with S-benzoylmercaptoethylamine hydrochloride. All the remaining operations are the same as described in the above example. The yield is again hardly altered.

(c) The equivalent quantity (4.6 gm.) of isovaleric acid chloride can be employed in place of chloroformic acid ethyl ester for the production of the mixed acid anhydride. See Journal of the American Chemical Society, 73, 5553 (1951). The acid anhydride of pantothenic acid and isovaleric acid, after addition of 7.6 gm. of tri-n-butylamine or approximately 5 gm. of triethylamine, is treated with S-benzoylmercaptomethylamine hydrochloride in the same way as described in Example 1.

(d) The mixed acid anhydride obtained from triethylammonium salt of pantothenic acid and diethylchlorphosphite (see Journal of the American Chemical Society, 74, 5307, 5309 (1952)) in dimethyl formamide, when reacted with S-benzoylmercaptoethylamine hydrochloride in the presence of an excess of triethylamine, likewise, gives S-benzoyl-pantetheine in good yield.

(e) A solution containing approximately 40–45 millimols of d-pantothenic acid azide [obtained as described by Wittle et al. Journal of the American Chemical Society, 75, 1694 (1951) from 4.9 gm. (0.05 mol) of β-alaninethylester hydrochloride and 4.16 gm. (0.05 mol) (—) pantolactone followed by reaction of the ester obtained with 85% hydrazine hydrate (1.9 cc.), hydrochloric acid and sodium nitrite (2.2 gm.)] after treatment with 7.6 gm. of tri-n-butylamine or 5 gm. of triethylamine, is reacted in a manner analogous to that described in Example 1 with 8.9 gm. of S-benzoylmercaptoethylamine hydrochloride. Yield is somewhat lower in the above described process.

EXAMPLE 2

7.6 gm. of tri-n-butylamine or 5 gm. of triethylamine in 50 to 100 cc. of ethyl acetate are added to the mixed acid anhydride produced as described in Example 1 from 10 gm. of calcium-d-pantothenate by reaction, directly or via triethyl ammonium pantothenate, with 4.1 gm. of chloroformic acid ethyl ester or 4.6 gm. of isovaleric acid chloride. 10.9 gm. of α-naphthoylmercaptoethylamine hydrochloride (melting point 116–118° C.), (obtained by reacting α-naphthalene carboxylic acid chloride with 2-mercaptoethylamine hydrochloride) are now added at approximately —5° C. with vigorous stirring. The reaction mass is stirred for two hours whilst the temperature is maintained at approximately 0° C. by means of an ice-water bath. A further 750 cc. of ethylacetate are now added and the solution is washed repeatedly with water containing a little hydrochloric acid ($2\times50$ cc.) and thereafter with pure water ($3\times50$ cc.). The solution is dried with 15 gm. of sodium sulfate and concentrated with stirring to 70–80 cc. Crystallization commences on rubbing with a glass rod. The material is allowed to stand for some time in the ice bath. The crude product melts at 100–104° C. It can be recrystallized from a little ethyl acetate and then melts at 106–108° C. The yield of S-α-naphthoyl-pantetheine amounts to 11 gm., i. e. 63% of the theoretical, including the amounts recovered by working up the mother liquors.

The solubilities of S-α-naphthoyl-pantetheine in grams per 100 cc. are as follows: in ethanol 5.7, dioxan 5, tetrahydrofurane 5, acetone 1.4, dimethylformamide 35.

The pure crystalline product is practically insoluble in water, ether, ethylacetate and glycerine.

Microanalysis: $C_{22}H_{28}O_5N_2S$—
 Calculated: C 61.08%; H 6.52%; N 6.48%; S 7.42%.
 Found: C 60.95%; H 6.73%; N 6.63%; S 7.33.
 $(\alpha)_D^{20}=+16.5°$ (c=1, in dioxan).

IDENTIFICATION 500 mg. of S-α-naphthoyl-pantetheine were dissolved at 35° C. in 10 cc. of dioxan, the solution was cooled and made up to 25 cc. with aqueous ammonia (1:1). The solution obtained was allowed to stand for one hour and 20 minutes and then subjected to paper chromatography with a mixture of butanol, water, acetic acid 4:5:1. After two hours development was carried out with nitroprussate when a stain of Rf=0.75, characteristic for pantetheine, was obtained. The solution employed for the chromatography was extracted with ethyl acetate, washed with water, dried and evaporated. There remained a residue of 164 mg., melting point 180–191° C. When recrystallized from alcohol, the melting point was 203° C. The mixed melting point with α-naphthoylamide showed no depression.

EXAMPLE 3

7.6 gm. of tri-n-butylamine or 5 gm. of triethylamine in 50–100 cc. of ethyl acetate are added at —5° C. to a solution obtained as in Example 1 and 2 of the mixed anhydride of pantothenic acid with ethyl carbonic acid, isovaleric acid or dialkylphosphorous acid (corresponding to 42 millimols). After 5 to 10 minutes 10.9 gm. of S-β-naphthoyl-mercaptoethylamine hydrochloride (melting point 210° C. obtained by reacting β-naphthalene carboxylic acid chloride with 2-mercaptoethylamine hydrochloride) are added in a single portion with vigorous stirring. The temperature is maintained at approximately 0° C. by cooling with ice water. Stirring is continued for three hours at this temperature, thereafter 500 cc. of ethyl acetate are added and the solution is washed repeatedly with slightly acidified and pure water. After drying with sodium sulfate the liquid is concentrated to approximately 80 cc. in vacuo. Spontaneous crystallization occurs. The crude product (S-β-naphthoyl-pantetheine) is purified by recrystallization from as little ethyl acetate as possible. It melts at 148.5–149° C. The yield is 12.8 g. (73% of the theoretical). The solubilities of the product in grams per 100 cc. is as follows:

In ethanol 6, dioxan 4.2, tetrahydrofurane 3.7, dimethylformamide 40. The product is practically insoluble in water, ether, ethylacetate, acetone, butanol, benzene and olive oil.

Microanalysis: $C_{22}H_{28}O_5N_2S$—
 Calculated: C 61.08%; H 6.52%; N 6.48%; S 7.42%.
 Found: C 61.15%; H 6.59%; N 6.36%; S 7.39%.
 $(\alpha)_D^{20} = +16.99°$ (c=1 in dioxan).

IDENTIFICATION 500 mg. β-naphthoyl-pantetheine were dissolved in 10 cc. of dioxan at 35° C. The solution was cooled to 18° C. and made up to 25 cc. with aqueous ammonia (1:1). The further procedure was as in Example 2. Pantotheine was established chromatographically and 158 mg. of crude β-napthoylamide were obtained melting at 188–190° C., and after recrystallization from alcohol at 194–195° C.

EXAMPLE 4

7.6 gm. of tri-n-butylamine or 5 gm. of triethylamine in 50 cc. of ethyl acetate are added at —5° C. to a solution of mixed acid anhydride (corresponding to 42 millimols) obtained as in the foregoing examples, 10.6 gm. of S - p - bromo - benzoylmercaptoethylamine hydrochloride (melting point 195–196° C.) are added in a single portion with vigorous stirring. The mixture is stirred for a further three hours while the temperature is maintained at 0° C. by cooling with ice water. The S-p-bromobenzoylmercaptoethylamine hydrochloride does not react completely. A part can be recovered pure in a quantity of 3.8 gm. of melting point 195–196° C. by filteration and washing with ethyl acetate. The filtrate is treated with 500 cc. of ethyl acetate and thereafter washed repeatedly with slightly acidified water and thereafter with pure water, dried with sodium sulfate and concentrated in vacuo to approximately 30 cc. Crystallization of the product is induced by seed crystals or by rubbing with a glass rod. 7 gm. of S-p-bromobenzoylpantetheine are obtained, which melt at 114–115° C. after recrystallization from ethyl acetate.

The solubilities of S-p-bromobenzoyl-pantetheine in grams per 100 cc. are: In ethanol 40, ethylacetate 1, dioxan 25, tetrahydrofurane 50. The product is practically insoluble in water, ether and benzene.

EXAMPLE 5

7.6 gm. of tri-n-butylamine or 5 gm. of triethylamine in 50 to 100 cc. of ethyl acetate are added at —5° C. to a solution of the mixed acid anhydride (corresponding to 42 millimols) obtained as in the foregoing examples from 10 gm. of calcium-pantothenate. 13.6 gm. of S-myristylmercaptoethylamine hydrochloride, produced from myristic acid chloride and 2-mercaptoethylamine hydrochloride, melting point 126–128° C., are added in one portion. The mixture is stirred cold for three hours and the solution allowed to warm up to room temperature. The unreacted S-myristylmercaptoethylamine hydrochloride (4.8 gm.) are removed by filtration, the solvent is removed in vacuo and the residue is poured with stirring into 250 cc. of water acidified with a little hydrochloric acid. The water is decanted off, the undissolved product is washed with 130 cc. of fresh water and thereafter taken up in 500 cc. of diethyl ether. The ethereal solution is dried and the solvent is evaporated. The residue is recrystallized from hexane. In this way 13.8 gm., i. e. 62.7% of the theoretical, of S-myristyl-pantetheine, of melting point 52–53° C., are obtained. This compound is very readily soluble even in the cold in ethanol, benzene, chloroform and ethyl acetate but sparingly soluble in water and relatively less soluble in cold petroleum ether.

Microanalysis: $C_{25}H_{48}O_5N_2S$—
 Calculated: C 61.44%; H 9.90%; N 5.73%; S 6.56%.
 Found: C 61.51%; H 9.77%; N 5.86%; S 6.58%.
 $(\alpha)_D^{20} = +15.3°$ (c=1 in dioxan).

IDENTIFICATION 20 mg. of S-myristyl-pantetheine were dissolved in 1 cc. of saturated methanolic ammonia and the solution was subjected after 30 minutes to paper chromatography with butanol, water and acetic acid 4:5:1. Development with nitro-prussate gave Rf=0.75, which is characteristic for pantetheine.

EXAMPLE 6

12.4 gm. i. e. 57.6% of the theoretical, of S-palmityl-pantetheine of melting point 54.5–55° C. are obtained in manner analogous to that described in Example 5, by reacting 42 millimols of the mixed acid anhydride (produced from 10 gm. of calcium pantothenate) with 14 gm. of S-palmitylmercaptoethylamine hydrochloride (produced by reacting palmityl chloride with 2-mercaptoethylamine hydrochloride, of melting point 94° C).

The solubilities of the pure crystalline product in grams per 100 cc. were as follows:

At room temperature in benzene 50, tetrahydrofurane 15, ethylacetate 1.5. At the boiling point, in hexane 20, ethylether 1, ethylacetate 50. The product contains ½ mol water of crystallization, titratable by the method of K. Fischer.

Microanalysis: $C_{27}H_{52}O_5N_2S$—
 Calculated: C 61.66%; H 10.18%; N 5.33%; S 6.09%; $H_2O$ 1.71%.
 Found: C 61.39%; H 10.12%; N 5.33%; S 5.96%; $H_2O$ 1.45%.
 $(\alpha)_D^{20} = +15.1°$ (c=1 in dioxan).

IDENTIFICATION

The same result is obtained as with S-myristyl-pantetheine.

EXAMPLE 7

11.5 gm., i. e. 51.6% of the theoretical, of S-stearyl-pantetheine of melting point 58–59° C. are obtained in manner analogous to that described in Example 5 by reacting 42 millimols of the mixed acid anhydride (produced from 10 gm. of calcium pantothenate) with 15.9 gm. of S-stearylmercapto-ethylamine hydrochloride (produced by reacting stearyl chloride with 2-mercaptoethyl-amine hydrochloride, of melting point 104° C.).

The solubilities of the product in grams per 100 cc. are as follows:

At room temperature in ethanol 1, ethylacetate 1, ether 1, benzene 50; at the boiling point, in ethanol 50, ethylacetate 50, ether 1.7.

EXAMPLE 8

12.15 gm., i. e. 74% of the theoretical, of S-caproyl-pantetheine are obtained in manner analogous to that described in Example 5 by reacting 42 millimols of the mixed acid anhydride (produced from 10 gm. of calcium-pantothenate) with 10 gm. of S-caproylmercaptoethylamine hydrochloride (produced by reacting caproyl chloride with 2-mercaptoethylamine hydrochloride, of melting point 134–135° C.). The product on recrystallization from ethylacetate melts at 43° C. The crystals are very deliquescent.

Microanalysis: $C_{17}H_{32}O_5N_2S$—
 Calculated: C 56.41%; H 8.97%; N 6.92%; S 7.92%.
 Found: C 56.26%; H 9.12%; N 6.94%; S 8.04%.
 $(\alpha)_D^{20} = +14.9°$ (c=1 in dioxan).

EXAMPLE 9

10.5 gm. of S-lauryl-pantetheine of melting point 49–50° C. are obtained in manner analogous to that described in the foregoing examples, by reacting the mixed anhydride (produced from 10 gm. of calciumpantothenate) with 12.4 gm. of S-laurylmercaptoethylamine hydrochloride.

What we claim is:

1. Process for the production of S-acyl-pantetheines, which comprises treating the mixed anhydride of pantothenic acid and an acid selected from the group consisting of an alkyl carbonic acid and an alkyl carboxylic acid with an S-acyl-thioethylamine hydrochloride containing an acyl radical selected from the group consisting of higher fatty acid radicals containing 6 to 18 carbon atoms in the presence of an acid binding agent.

2. Process for the production of S-acyl-pantetheines, which comprises treating the mixed anhydride of pantothenic acid and an alkyl carbonic acid with an equimolecular quantity of an S-acyl-thioethylamine hydrochloride containing an acyl radical selected from the group consisting of higher fatty acid radicals containing 6 to 18 carbon atoms in the presence of a tertiary amine.

3. Process for the production of S-acyl-pantetheines, which comprises treating the mixed anhydride of pantothenic acid and ethyl carbonic acid with an equimolecular quantity of an S-acyl-thioethylamine hydrochloride containing an acyl radical selected from the group consisting of higher fatty acid radicals containing 6 to 18 carbon atoms in the presence of a tertiary amine and in an inert solvent at approximately 0° C.

4. Process for the production of S-caproyl-pantetheine, which comprises treating the mixed anhydride of pantothenic acid and ethyl carbonic acid with an equimolecular quantity of S-caproyl-thioethylamine hydrochloride in the presence of a tertiary amine and in ethyl acetate at approximately 0° C.

5. Process for the production of S-lauroyl-pantetheine, which comprises treating the mixed anhydride of pantothenic acid and ethyl carbonic acid with an equimolecular quantity of S-lauroyl-thioethylamine hydrochloride in the presence of a tertiary amine and in ethyl acetate at approximately 0° C.

6. Process for the production of S-myristoyl-pantetheine which comprises treating the mixed anhydride of pantothenic acid and ethyl carbonic acid with an equimolecular quantity of S-myristoyl-thioethylamine hydrochloride in the presence of a tertiary amine and in ethyl acetate at approximately 0° C.

7. Process for the production of S-palmitoyl-pantetheine which comprises treating the mixed anhydride of pantothenic acid and ethyl carbonic acid with an equimolecular quantity of S-palmitoyl-thioethylamine hydrochloride in the presence of a tertiary amine and in ethyl acetate at approximately 0° C.

8. Process for the production of S-stearoyl-pantetheine which comprises treating the mixed anhydride of pantothenic acid and ethyl carbonic acid with an equimolecular quantity of S-stearoyl-thioethylamine hydrochloride in the presence of a tertiary amine and in ethyl acetate at approximately 0° C.

References Cited in the file of this patent
UNITED STATES PATENTS

| | | |
|---|---|---|
| 2,625,565 | Snell | Jan. 13, 1953 |

FOREIGN PATENTS

| | | |
|---|---|---|
| 521,190 | Belgium | Jan. 4, 1954 |
| 707,709 | Great Britain | Apr. 21, 1954 |

OTHER REFERENCES

Wieland et al.: Naturwissenschaft, vol. 38, August 1951, page 384.